UNITED STATES PATENT OFFICE.

JOHN B. ZIEGLER AND JOHN F. ZIEGLER, OF AIR LINE JUNCTION, OHIO.

WATER-FILTERING MEDIUM.

SPECIFICATION forming part of Letters Patent No. 409,895, dated August 27, 1889.

Application filed March 12, 1889. Serial No. 303,025. (No specimens.)

*To all whom it may concern:*

Be it known that we, JOHN B. ZIEGLER and JOHN F. ZIEGLER, citizens of the United States, residing at Air Line Junction, in the county of Lucas and State of Ohio, have invented certain new and useful Improvements in Water-Filtering Mediums; and we do declare the following to be a full, clear, and exact description of the invention, such as will enable others skilled in the art to which it appertains to make and use the same.

This invention relates to water-filtering mediums; and it consists of the combination of a strong aluminous clay, alluvial or quick sand, and wood pulp obtained by abrasion, in about the following proportions: strong aluminous clay, seventy parts; alluvial or quick sand, thirty parts; wood pulp, fifty parts. The amount of wood pulp can be varied according to texture of filter required. These ingredients are to be well mixed in about the proportions set forth above. The mixture is then thoroughly ground in a potter's-clay mill with sufficient water to make it about the temper of tile-clay. It is then molded, turned, jiggered, pressed, or tamped into any desired shape, cone and tube shape being preferred. When the molded article is sufficiently dried, it is put into a potter's kiln and burned until the wood pulp is entirely consumed, the properties of alluvial or quick sand (differing from other disintegrated sands) being cohesive, and acting as a binder, forming a strong mass, and at the same time leaving it to some degree porous. The addition of wood pulp, it being very fine, leaves, when properly burned out, very minute pores in the walls of the cylinder, tube, or other shapes. This so-constructed filtering medium will be strong, durable, and of so fine a texture as to exclude all organism, dead or alive, of whatever kind or name. Most all aluminous clays can be used in this combination; but should any one desire to use clay which consists in part of alluvial or quick sand they must first take some of the clay, make of it a thin solution with water, let it stand until well settled, then pour off water, draw off clay and sand, separate them and find the proportions, and if either is lacking the proper quantity add to it according to the given proportion or formula.

Having thus described our invention, what we claim as new, and desire to secure by Letters Patent, is—

The hereinbefore-described filtering composition composed of aluminous clay, alluvial or quick sand, and wood pulp, in about the proportions set forth.

In testimony whereof we affix our signatures in presence of two witnesses.

JOHN B. ZIEGLER.
JOHN F. ZIEGLER.

Witnesses:
C. R. BOWEN,
J. G. BRENNER.